US010356064B1

United States Patent
Howard et al.

(10) Patent No.: US 10,356,064 B1
(45) Date of Patent: Jul. 16, 2019

(54) DISTRIBUTED ON-DEMAND KEY MANAGEMENT FOR RANGELESS ENVIRONMENTS

(71) Applicant: Rockwell Collins, Inc., Cedar Rapids, IA (US)

(72) Inventors: Sean D. Howard, Cedar Rapids, IA (US); Justin D. Davis, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 213 days.

(21) Appl. No.: 15/143,907

(22) Filed: May 2, 2016

(51) Int. Cl.
*H04L 9/00* (2006.01)
*H04L 29/06* (2006.01)

(52) U.S. Cl.
CPC ........ *H04L 63/062* (2013.01); *H04L 63/0428* (2013.01); *H04L 63/101* (2013.01)

(58) Field of Classification Search
CPC .................................................. H04L 63/062
See application file for complete search history.

(56) References Cited

U.S. PATENT DOCUMENTS

2006/0251258 A1* 11/2006 Lillie ................... H04L 63/061
  380/270
2009/0055646 A1*  2/2009 Sussland ............... G06F 21/445
  713/168

\* cited by examiner

*Primary Examiner* — Alexander Lagor
*Assistant Examiner* — Syed M Ahsan
(74) *Attorney, Agent, or Firm* — Donna P. Suchy; Daniel M. Barbieri

(57) ABSTRACT

Disclosed herein are systems and methods for distributed key management. A first communications node may join a network. The first communications node may receive a white list generated by a central authority. The white list may include criteria for selecting a master communications node that may generate and distribute a cryptographic key for the network. The white list may also identify one or more communications nodes authorized to receive the generated cryptographic key. Responsive to detecting a second communications node joining the network, the first communications node may determine whether the second communications node is to be the master communications node for the network.

15 Claims, 8 Drawing Sheets

US 10,356,064 B1

DISTRIBUTED ON-DEMAND KEY MANAGEMENT FOR RANGELESS ENVIRONMENTS

FIELD OF THE DISCLOSURE

The present disclosure is directed to techniques to secure a network, including but not limited to systems and methods for distributed key management.

BACKGROUND

Cryptographic algorithms executing on computing devices may use one or more keys to encode and decode transmitted and received messages. Keys may be exchanged over a networked environment so that authorized computing devices may cipher and decipher such transmitted and received messages. In some types of networks in which a geographical span and/or number of associated computing devices may change or be logistically challenging to manage for example, conventional methods of distributing a key from a central source may be inadequate. For instance, coordinating the sharing, exchanging, or distribution of cryptographic keys for use may pose operational challenges. As an example, multiple authorities operating at different administrative levels may distribute different keys for use with cryptographic algorithms. A main datacenter may distribute cryptographic keys different from the cryptographic keys distributed by a base station. The cryptographic keys from the main datacenter may encode and decode differently from cryptographic keys distributed by the base station. In this scenario, mobile computing devices may move from within range of one authority to a range of another authority. As the communication range extending from a given authority may be geographically restricted, there may be a limited time window in which to distribute new cryptographic keys to all the computing devices connected to the various networks. New cryptographic keys may be frequently generated and distributed, and therefore a coordination of mobile computing devices may be logistically difficult. Consequently, less than a subset of mobile computing devices may receive updated cryptographic keys for use in cryptographic algorithms, resulting in some mobile computing devices of the network not being able to encode and decode messages properly.

SUMMARY

According to inventive concepts described herein, systems and methods described herein leverage on localization of the generation and/or distribution of cryptographic keys to the communications node level. One aspect, according to inventive concepts described herein, is directed to a method for distributed key management. A first communications node of a network may receive a first white list generated by a central authority. The first white list may include one or more criteria for selecting a master communications node for the network. The master communications node may be for generating a cryptographic key and distributing the cryptographic key to one or more other communications nodes in the network. The first white list may further identify a first list of communications nodes authorized to receive the generated cryptographic key. The first communications node may detect that a second communications node from the first list of communications nodes is joining the network. The first communications node may determine, responsive to the detection and according to the one or more criteria included in the first white list, whether the second communications node is to be the master communications node for the network.

In some embodiments, the first communications node may receive a second white list from the second communications node to replace the first white list. In some embodiments, the second white list may include a version that supersedes that of the first white list.

In some embodiments, the first communications node may receive a first cryptographic key generated by the second communications node. The second communications node may be determined to be the master communications node for the network. The first communications node may transmit the received first cryptographic key to a third communications node of the network from the first list. In some embodiments, the first communications node may send the first white list to the second communications node.

In some embodiments, the first communications node may detect that a plurality of communications nodes is joining the network. The plurality of communications nodes may include the second communications node. In some embodiments, the method may include determining, responsive to the detection and according to the one or more criteria included in the first white list, whether any one of the plurality of communications nodes is to be the master communications node for the network.

In some embodiments, the first communications node may determine, according to the one or more criteria included in the first white list, that the first communications node is the master communications node. In some embodiments, the first communications node may generate, at a first time instance, a first cryptographic key for distribution to one or more communications nodes in the network. In some embodiments, the first communications node may generate, at a second time instance, a second cryptographic key for distribution to the one or more communications nodes to replace the first cryptographic key.

In some embodiments, the one or more criteria for determining the master communications node may include one or more criteria based at least in part on an identifier of a candidate communications node. The first communications node may detect that the master communications node in the network is no longer available. In some embodiments, the first communications node may identify, according to the one or more criteria included in the first white list, a new master communications node for the network.

In some embodiments, the first white list may include the first list of communications nodes authorized for a first security level using the generated cryptographic key. The first communications node may receive a second white list including a second list of communications nodes authorized for a second security level using a second cryptographic key.

According to inventive concepts described herein, another aspect is directed to a communications node for use in distributed key management. The communications node may include a receiver, a memory, and a processor. The receiver may be configured to receive a first white list generated by a central authority. The first white list may include one or more criteria for selecting a master communications node for a network. The master communications node may be for generating a cryptographic key and distributing the cryptographic key to one or more other communications nodes in the network. The white list may further identify a first list of communications nodes authorized to receive the generated cryptographic key. The memory may be configured to store the received first white list. The processor may be configured to detect that a second communications node from the first list of communications nodes is joining the network. The process may be configured to determine, responsive to the detection and according to the one or more criteria included in the first white list, whether the second communications node is to be the master communications node for the network.

In some embodiments, the receiver may be further configured to receive a second white list from the second communications node to replace the first white list. The second white list may include a version that supersedes that of the first white list. In some embodiments, the receiver may be further configured to receive a first cryptographic key generated by a communications node determined to be the master communications node for the network.

In some embodiments, the communications node may further include a transmitter. The transmitter may be configured to transmit the received first cryptographic key to a third communications node of the network. The processor may be further configured to detect that a plurality of communications nodes including the second communications node is joining the network. In some embodiments, the processor may be further configured to determine, responsive to the detection and according to the one or more criteria included in the first white list, whether any one of the plurality of communications nodes is to be the master communications node for the network.

In some embodiments, the communications node may be the master communications node. The communications node may further include a key generator. The key generator may be configured to generate a first cryptographic key for distributing one or more communications node in the network.

In some embodiments, the processor may be further configured to detect that the master communications node in the network is no longer available. The processor may be further configured to identify, according to the one or more criteria included in the first white list, a new master communications node for the network.

According to inventive concepts described herein, another aspect is directed to a method for distribution key management. A first communications node may join a network comprising at least a second communications node. The first communications node may receive a first white list from the second communications node. The first while list may include one or more criteria for selecting a master communications node for the network. The master communications node may be for generating a cryptographic key and distributing the cryptographic key to one or more other communications nodes in the network. The first white list may further identify a first list of communications nodes authorized to receive the generated cryptographic key. The first communications node may determine, according to the one or more criteria included in the first white list, whether the first communications node is to be the master communications node for the network.

In some embodiments, receiving the first white list may include receiving the first white list to replace a second white list stored in the first communications. The first white list may include a version that supersedes that of the second white list.

These and other aspects and embodiments are discussed in detail below. The foregoing information and the following detailed description include illustrative examples of various aspects and embodiments, and provide an overview or framework for understanding the nature and character of the claimed aspects and embodiments.

BRIEF DESCRIPTION OF THE DRAWINGS

Various objects, aspects, features, and advantages of the inventive concepts disclosed herein will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
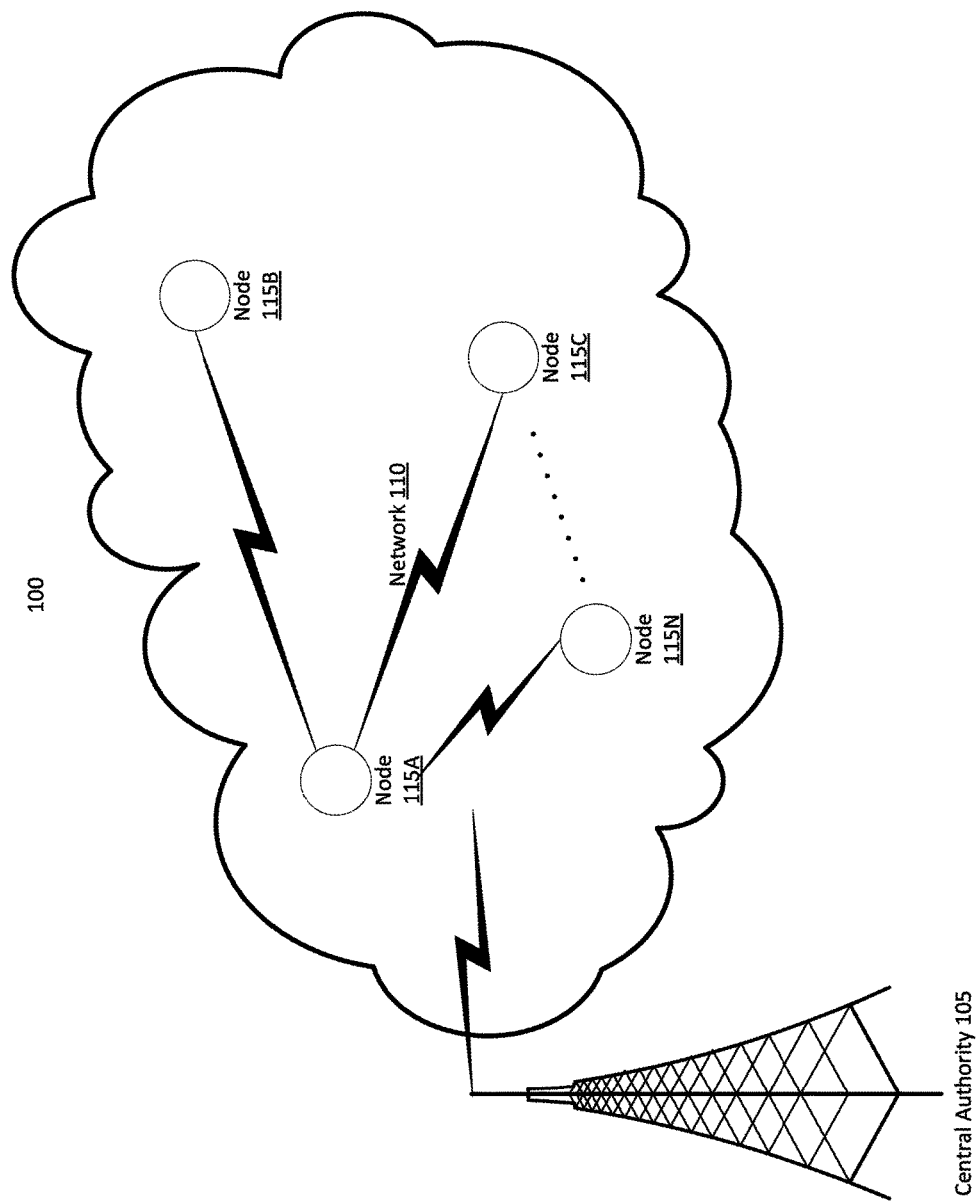
FIG. 1A is a block diagram depicting a distributed key management system, according to an illustrative embodiment.

The details of various embodiments of the methods and systems are set forth in the accompanying drawings and the description below.

DETAILED DESCRIPTION

Computing devices may apply various cryptographic algorithms to encrypt and decrypt messages communicated among the computing devices of a network using one or more cryptographic keys. In asymmetric cryptographic schema, for example, a computing device may use a public key shared among the network to encrypt transmitted messages and use a private key particular to the computing device to decrypt received messages. The public key shared among the computing devices of the network may have a specified expiration time, or period of validity. Upon reaching the expiration time, a new public key may be exchanged among the computing devices to cipher and decipher subsequent messages. Furthermore, in symmetric cryptographic schema, a computing device may use one of a set of common keys shared among the network to encrypt and decrypt messages. The set of common keys may be shared among the computing devices using various key sharing or distribution protocols.

In both the asymmetric and the symmetric cryptographic schema, to continuously and properly cipher and decipher messages, a central authority may distribute new cryptographic keys from time to time to the computing devices of the network. Coordinating the sharing, exchanging, or distribution of cryptographic keys for use with such cryptographic algorithms, however, can be complex.

In some embodiments, the systems and methods described herein leverage on localization of the generation and/or distribution of cryptographic keys to the communications node level. In some embodiments, the system may include a central authority (e.g., data center or base station) and a multitude of communications nodes (e.g., mobile computing devices) connected to one another in a network. At least some of the communications nodes may each receive a white list from the central authority. The white list may specify one or more criteria for selecting a master communications node from the communications nodes in the network and a set of communications nodes authorized to receive cryptographic keys. The master communications node may be designated as the communications node responsible for generating a cryptographic key and distributing the cryptographic key to other communications nodes in the network.

Whenever the entering of a new communications node is detected, the master communications node may determine whether the new communications node is to be made the new master communications node in accordance to the one or more criteria specified in the white list. If so, the newly entered communications node may be designated as the new master communications node and may immediately or at a designated or calculated time, start generating a new cryptographic key and distributing the new cryptographic key to the other communications nodes of the network. If not, the current or existing master communications node is to distribute the cryptographic key to the newly entered communications node. From time to time, the central authority may generate and transmit new white lists to the communications nodes, with each new white list specifying updated information, such as a new criteria and/or a new set of communications nodes authorized to receive cryptographic keys. Because individual communications nodes within a network may generate and/or distribute cryptographic keys, coordinating the physical deployment of computing devices to receive such keys from the respective authority may be reduced or eliminated.

Referring now to FIG. 1A, depicted is one embodiment of a block diagram of a distributed key management system 100, in accordance with inventive concepts disclosed herein. In brief overview, the distributed key management system 100 may include a central authority 105, a network 110, and one or more communications nodes 115A-N, among other network components. The central authority 105 and the one or more communications nodes 115A-N each may comprise any form or type of computing device with communications and encryption/decryption functionalities. The central authority 105 and the one or more communications nodes 115A-N may communicate with one another directly point-to-point or via the network 110. Details regarding the central authority 105, the network 110, and the one or more communications nodes 115A-N are detailed herein in conjunction with FIG. 1B.

Terms such as "computing device," "wireless communication device," "user equipment," "mobile station," "mobile," "mobile device," "access terminal," "terminal," "handset," "computer," and similar terminology, can refer to a communications node utilized by a user or operating automatically to receive or convey data, control messages, voice, video, sound, gaming data, or substantially any data-stream or signaling-stream. The foregoing terms can be utilized interchangeably in the present disclosure. A communications node can for example comprise but not limited to a laptop, desktop computer, cellular/smart phone, tablet, vehicle (e.g., aircraft, automobile, watercraft, spacecraft), robotic device, household/office/military appliance or device, satellite, or pseudolite, A central authority 105 may refer to a wireless network component or apparatus that serves and receives data, control messages, voice, video, sound, gaming data, or substantially any data-stream or signaling-stream from/to one or more communications nodes.

Figure 1B:
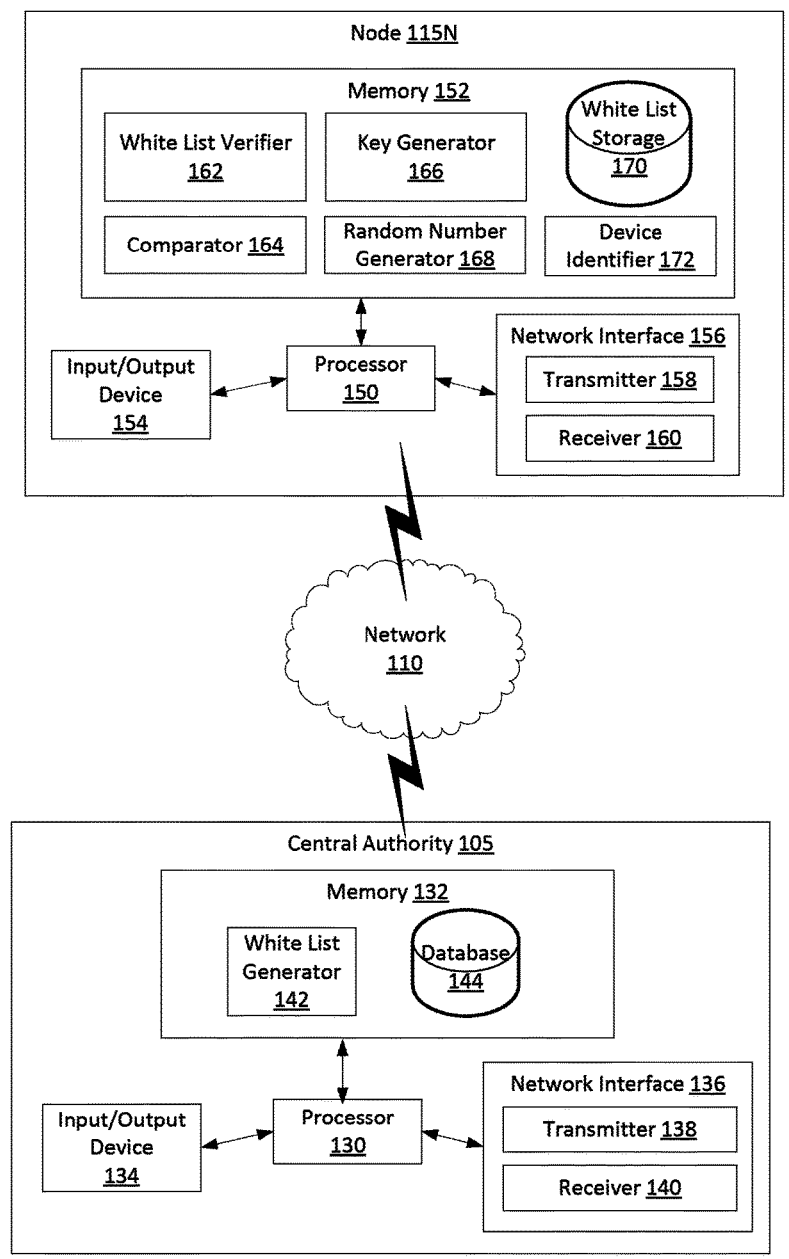
FIG. 1B is a block diagram depicting architectures for devices of a distributed key management system, according to an illustrative embodiment.

Referring now to FIG. 1B, depicted is a block diagram of an example embodiment of architectures for devices of a network environment 100 for distributed key management, according to inventive concepts disclosed herein. In brief overview, the central authority 105 may include a processor unit 130, a memory unit 132, an input/output device 134, and a network interface 136. The memory 132 may include instructions for a whitelist generator 142 and a database 144. The network interface 136 may include a transmitter 138 and a receiver 140. Each of the communications nodes 115A-N may include one or more processors 150, a memory unit 152, an input/output device 154, and a network interface 156. The memory unit 152 may include instructions for a key generator 166, a random number generator 168, a white list verifier 162, a comparator 164, a device identifier 172, and a white list storage 172. The network interface 156 may include a transmitter 158 and a receiver 160.

In both the central authority 105 and all of the communications nodes 115A-N, each module and sub-module thereof (e.g., the white list generator 142, the white list verifier 162, the comparator 164, the key generator 166, and the random number generator 168) may include hardware or a combination of hardware and software. Each module or submodule may include any application, program, library, daemon, applet, script, task, service, process or any type and form of executable instructions executing on any type and form of hardware of the system. For example, the comparator 164 may be any executable logic for comparing two or more values, and the random number generator 168 may be any executable logic for calculating pseudo-random numbers using any number of parameters. In some embodiments, a module or submodule may incorporate one or more processors and/or circuitries configured to perform any of the operations and functions described herein. As detailed below, the white list generator 142, the key generator 166, the random number generator 168, the white list verifier 162, and/or the comparator 164 each may be executed on the processor unit of the respective computing device.

The central authority 105 may comprise any type and/or form of a computing device with communications and/or encryption/decryption functionalities. The central authority 105 may be included in a communication datacenter, a base transceiver station, a repeater, a network switch, a wireless router, a radio tower, a mobile cell site, or any other network component. In some embodiments, the central authority 105 may include one or more computing devices connected to the network 110 via the network interface 136, and may be in communication with the one or more communications nodes 115A-N. For example, the central authority 105 may include elements or features from a server farm or cloud, and may include routers, load balancers, network address translators, firewalls, or other such devices.

In the central authority 105, the processor unit 130 may be any logic circuitry that processes instructions fetched from the memory 132. The processor unit 130 may include a microprocessor unit, an application-specific integrated circuit (ASIC), and a field-programmable gate array (FPGA), among others. In some embodiments, the processor unit 130 may be a multi-core processor or an array of processors.

The memory unit 132 may be one or more memory chips capable of storing program instructions, such as the white list generator 142, and other data, such as the database 144. The memory unit 132 may include electronic, optical, magnetic, or any other storage device capable of relaying or providing the process unit 130 with program instructions. The memory unit 132 may include a floppy disk, CD-ROM, DVD, magnetic disk, memory chip, Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD), optical media, or any other suitable device for providing or relaying program instructions and other data to the processor unit 130. The program instructions may include code from any programming language, such as C, C++, C#, Java, JavaScript, Perl, HTML, XML, Python, Visual Basics, et cetera, or any combination thereof.

The input/output device 134 may include any number of connected devices used to receive input signals to the processor unit 130 and to send output signals from the processor unit 130. Input devices may include keyboards, mice, trackpads, trackballs, microphones, dials, touch pads, drawing tablets, accelerometers, and gyroscopes, among others. Output devices may include video displays, speakers, printers, projectors, and headsets, among others. The input/output device 134 may be controlled by an input/output controller.

The network interface 136 may include the transmitter 138 and the receiver 140. The network interface 136 may include a built-in adapter, a wireless network adapter, universal serial bus (USB) network adapter, modem, or any other device for interfacing the central authority 105 with the network 110. The transmitter 138 may transmit any data via the network 110 to the one or more communications nodes 115A-N and other devices connected to the network 110. The receiver 140 may receive any data via the network 110 from the one or more communications nodes 115A-N and other devices connected to the network 110. The network interface 136 may interface with the network 110 or directly with the one or more communications nodes 115A-N through a variety of connections. The connections may be of any type, including LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or any combination thereof. Connections may be established using a variety of communication protocols, such as TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax, 3GPP and direct asynchronous connections. In some embodiments, the network interface 136 may communicate with the other devices of the network 110 using any type and/or form of gateway or tunneling protocol, such as Secure Socket Layer (SSL) or Transport Layer Security (TLS).

The white list generator 142 may generate a white list for distribution to one or more communications nodes. The white list may include one or more criteria for selecting a master communications node from the one or more communications nodes 115A-N. The master communications node may be designated as the communications node 115A-N responsible for generating a cryptographic key and/or distributing the cryptographic key to the one or more communications nodes 115A-N in the network 110. The one or more criteria for selecting the master communications node from the one or more communications nodes 115A-N may be specified using any number of methods. In some embodiments, the one or more criteria for selecting or determining the master communications node may be based at least in part on an identifier for each of the one or more communications nodes 115A-N. For example, the one or more criteria may specify that the communications node 115A-N within the network 110 corresponding to the highest or lowest numerical identifier is to be the master communications node. In another example, the one or more criteria may specify that the communications node 115A-N with the first or last (in A-Z order) hash value of an alphanumerical device identifier is to be the master communications node. In some embodiments, the one or more criteria for selecting or determining the master communications node may be based at least in part on a sequence, priority or order of the respective communications node 115A-N entering or joining the network. For example, the one or more criteria may specify that the first or latest communications node 115A-N to enter the network 110 is to be the master communications node. Responsive to generating the white list, the white list generator 142 may store the white list into the database 144.

The white list generator 142 may retrieve, access, or otherwise identify a list of communications nodes authorized to receive a cryptographic key. The list of communications nodes may be included in the white list. The list of communications nodes may comprise a data structure (e.g., array, matrix, table, heap, tree, list, linked list, etc.). The list of communications nodes may include identifiers for each of the one or more communications nodes 115A-N in the network 110. In some embodiments, the list of communications nodes may include security levels for each of the one or more communications nodes 115A-N in the network 110. The security levels may specify which cryptographic key the one or more communications nodes 115A-N is authorized to receive or use. For example, a subset of communications nodes 115A-N may be assigned to a first security level ("level 1") and another subset of communications nodes 115A-N may be as assigned to a second level ('level 2"). The subset of communications nodes 115A-N assigned to the first security level may be authorized to receive and use an cryptographic key different from the subset of communications nodes 115A-N assigned to the second security level. The database 144 may for instance include list(s) of communications nodes arranged by identifiers and/or security levels. The database 144, along with the list(s) of communications nodes, may be maintained and updated by the central authority 105 from time to time.

The white list generator 142 may specify a key transfer protocol and/or cryptographic algorithm to be used. The specified key transfer protocol and/or the cryptographic algorithm may be included into the generated white list. The key transfer protocol may be used by the one or more communications nodes 115A-N in the network 110 to transfer, exchange, or otherwise distribute the cryptographic keys generated by the master communications nodes. Examples of the key transfer protocol may include Diffie-Hellman key exchange, quantum key exchange (e.g., BB84), password-verification key agreement, web of trust, TSL-PSK, Firefly key exchange protocol, public key infrastructure (e.g., X.509 digital certificate), or any number of asymmetric key or symmetric public key sharing protocols. The cryptographic algorithm may be used by the master communications node designated for the network 110 to generate one or more cryptographic keys, and/or by the one or more communications nodes 115A-N in the network 110 to encode and decode messages in accordance with the specified cryptographic algorithm. Examples of the cryptographic algorithm may include MD5 message-digest algorithm, RSA encryption algorithm, elliptic curve cryptography (ECC), cryptographic hash function (e.g., FSB, GCM, SHA-1, SHA-2, HMAC, etc.), block cipher (e.g., Twofish, AES, DES, etc.), or any number of symmetric or asymmetric encryption schema.

In some embodiments, the white list generator 142 may generate, compute, or otherwise calculate cryptographic key, e.g., using a cryptographic card and/or a random number generator, with or without using a seed. In certain embodiments, the white list generator 142 may generate, compute, or otherwise calculate a seed for generating the cryptographic key using a pseudo-random number generator. The seed may be included in the white list. The seed may be used by the communications node 115A-N designated as the master communications node to generate the cryptographic key for communications among the one or more communications node 115A-N in the network 110. In some embodiments, the seed may be included into the list of communications nodes and may be designated by the security level for each of the one or more communications nodes 115A-N. For example, a subset of communications nodes 115A-N may be assigned to a first security level ("level 1") and another subset of communications nodes 115A-N may be as assigned to a second level ('level 2"). The master communications node selected from the subset of communications nodes 115A-N assigned to the first security level may generate the cryptographic key using a seed from the master communications node selected from the other subset of communications nodes 115A-N designated as the second security level.

The white list generator 142 may calculate, determine, set and/or specify an expiration time to the white list. The expiration time may be included into the white list. The expiration time may specify a time frame in which the white list may be used by the one or more communications nodes 115A-N in the network 110, for example to select the master communications node. The expiration time may also specify the time frame in which the white list may be used by the one or more communications nodes 115A-N to determine which of the one or more communications nodes 115A-N are authorized to receive the cryptographic key and/or white list. In some embodiments, the white list generator 142 may set the expiration time based on the security levels for each of the one or more communications nodes 115A-N. For example, the white list generator 142 may specify 12 hours as the expiration time for communications nodes 115A-N assigned to the first security level and 48 hours as the expiration time for communications nodes 115A-N assigned to the second security level. The expiration time may be any specified amount of time, and can range from 5 to 10 minutes to 2 to 3 weeks for example.

The white list generator 142 may generate a plurality of white lists, for example at least another white list (e.g., a second white list) in addition to the one referenced above. In some embodiments, the white list generator 142 may generate the other white list (or second white list) at a subsequent time. The other white list may include or have a version that supersedes a version of the previously generated white list. The version may be specified by a version number, a version identifier, timestamp or any combination thereof. The other white list may be different from the previously generated white list in one or more aspects. For example, the other white list may specify different criteria for selecting a master communications node from the one or more communications nodes 115A-N in the network 110. The other white list may include a different list of communications nodes authorized to receive the cryptographic key generated by the master communications node. The other white list may designate security levels for each of the one or more communications node 115A-N. The other white list may include a different seed for generating the cryptographic key. The other white list may also include a different expiration time. Receipt of the other white list by the one or more communications nodes 115A-N in the network 110 may cause the one or more communications nodes 115A-N to select a new master communications node and/or generate a new cryptographic key in accordance to the newly received other white list.

The transmitter 138 may transmit the white list to the one or more communications nodes 115A-N in the network 110. In some embodiments, the white list generator 142 may cause the transmitter 138 to transmit the white list to the one or more communications nodes 115A-N, responsive to generating the white list. In some embodiments, the network interface 134 or the processor 130 may detect or determine that at least one of the communications nodes 115A-N is within a network coverage range of the transmitter 138. In some embodiments, responsive to detecting or determining that at least one of the communications nodes 115A-N is within the network coverage range, the transmitter 138 may transmit the generated white list to the respective communications node 115A-N.

The receiver 140 may receive a request for a white list from the one or more communications nodes 115A-N. In some embodiments, the receiver 140 may receive the request for the white list via the network 110. In some embodiments, the receiver 140 may relay the request for the white list to the white list generator 142, causing the white list generator 142 to generate a white list or retrieve or access a previously generated white list stored at the database 144.

The network 110 may be any type and/or form of network and may include a local-area network (LAN), such as a wireless local-area network (WLAN), a metropolitan area network (MAN), a wide area network (WAN), such as a wireless wide area network (WWAN), an Internet area network (IAN), a point-to-point network, a broadcast network, a telecommunications network, a data communication network, a computer network, an ATM (Asynchronous Transfer Mode) network, a SONET (Synchronous Optical Network) network, a SDH (Synchronous Digital Hierarchy) network, a wireless network, a cellular network, satellite network, or a virtual network, among others. In some embodiments, the network 110 may be a private network or a public network. In some embodiments, the network 110 may include any number of computing devices such as the one or more communications nodes 115A-N. The network 110 can be of any topology, such as a point-to-point topology, a mesh topology (partially or fully connected), a bus topology, a tree topology, or a star topology, or any combination thereof, among others formed among the one or more communications nodes 115A-N. The network 110 may comprise mobile communications networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via the same protocol or different protocols.

As mentioned herein, the one or more communications nodes 115A-N may be any type and/or form of computing device with communications and encryption/decryption functionalities. The one or more communications nodes 115A-N may be referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 110. In some embodiments, the one or more communications nodes 115A-N may comprise a computing device housed, used or incorporated in an automobile, an airplane, a rocket, a drone, or a maritime vessel for instance. A subset of the communications nodes 115A-N may be one form of a computing device different from other subsets of the communications nodes 115A-N. Each of the one or more communications nodes 115A-N may correspond or may be identified by a device identifier 172. The device identifier 172 may be an alphanumeric value used to uniquely identify the respective communications node 115A-N. Examples of the alphanumeric value for the device identifier 172 may include a network address (e.g., Internet Protocol (IP) address or media access control (MAC) address), hash value, or randomly generated value, among others.

In each communications node 115A-N, the processor unit 150 may be any logic circuitry that processes instructions fetched from the memory 152. The processor unit 150 may include a microprocessor unit, an application-specific integrated circuit (ASIC), and a field-programmable gate array (FPGA), among others. In some embodiments, the processor unit 150 may be a multi-core processor or an array of processors.

The memory unit 152 may be one or more memory chips capable of storing program instructions, such as the white list generator 142, and other data, such as the white list storage 170 and the device identifier 172. The memory unit 152 may include electronic, optical, magnetic, or any other storage device capable of relaying or providing the process unit 150 with program instructions. The memory unit 152 may include a floppy disk, CD-ROM, DVD, magnetic disk, memory chip, Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD), optical media, or any other suitable device for providing or relaying program instructions and other data to the processor unit 150. The program instructions may include code from any programming language, such as C, C++, C#, Java, JavaScript, Perl, HTML, XML, Python, Visual Basics, et cetera, or any combination thereof.

The input/output device 154 may include any number of connected devices used to receive input signals to the processor unit 150 and to send output signals from the processor unit 150. Input devices may include keyboards, mice, trackpads, trackballs, microphones, dials, touch pads, drawing tablets, accelerometers, and gyroscopes, among others. Output devices may include video displays, speakers, printers, projectors, and headsets, among others. The input/output device 154 may be controlled by an input/output controller.

The network interface 156 may include the transmitter 158 and the receiver 160. The network interface 156 may include a built-in adapter, a wireless network adapter, universal serial bus (USB) network adapter, modem, or any other device for interface the respective communications node 115N with the network 110. The transmitter 158 may transmit any data via the network 110 to the central authority 105 and other devices connected to the network 110. The receiver 160 may receive any data via the network 110 from the central authority 105 and other devices connected to the network 110. The network interface 156 may interface with the network 110 or directly with the one or more communications nodes 115A-N through a variety of connections. The connections may be of any type, including LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or any combination thereof. Connections may be established using a variety of communication protocols, such as TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax, 3GPP and direct asynchronous connections. In some embodiments, the network interface 156 may communicate with the other devices of the network 110 using any type and/or form of gateway or tunneling protocol, such as Secure Socket Layer (SSL) or Transport Layer Security (TLS).

One or more communications nodes 115A-N may join or enter the network 110. In some embodiments, the joining or entering communications nodes 115A-N, via the respective network interface 156, may initiate a handshaking process with the one or more communications node 115A-N to join or enter the network 110. In some embodiments, the one or more communications nodes 115A-N may create or start, via the respective network interface 156, the network 110 by initiating communications among the one or more communications nodes 115A-N. For example, two communications nodes 115A and 115B may create a new network 110 by initiating a handshaking process. Subsequently, other communications nodes 115C-N may join the network 110 created initially by the two communications nodes 115A and 115B by also initiating a handshaking process with at least one communications node 115A-N in the network 110. The one or more communications nodes 115A-N may join a network 110 facilitated by the central authority 105. In some embodiments, the one or more communications nodes 115A-N may initiate a handshaking process with the central authority 105 to join or enter the network 110 facilitated by the central authority 105.

The receiver 160 may receive the white list 120 from the central authority 105 or another communications node 115A-N in the network 110. The white list 120 may include the one or more criteria for selecting a master communications node for the network 110, identify a list of communications nodes authorized to receive the cryptographic key generated by the master communications node, a seed (e.g., optional) for generating the cryptographic key, and/or the security levels for each of the communications nodes 115A-N on the list of the communications nodes, among others. In some embodiments, the white list may be particular to the security level for each of the communications nodes 115A-N on the list of communications node authorized to receive the generated cryptographic keys. In some embodiments, the receiver 160 may relay the white list received from the central authority 105 to the memory unit 152 for storage at the white list storage 170. In some embodiments, the receiver 160 may receive the white list 120, subsequent to the transmitter 158 transmitting a request for the white list 120 to the central authority 105 or another communications nodes 115A-N. In some embodiments, the network interface 156 may detect or determine that the central authority 105 is within a network coverage range of the transmitter 158 or the receiver 160. The transmitter 158 may transmit a request for the white list 120, responsive to detecting or determining that the central authority 105 is within the network coverage range. The transmitter 158 may also transmit the received white list to the other communications nodes 115A-N in the network 110.

In some embodiments, the receiver 160 may receive any number of other white lists from the central authority 106. The receiver 160 may receive another white list generated by the central authority 105 or via another communications node 105 to replace a previously received white list. The receiver 160 may receive one or more other white lists subsequent to receiving the original white list 120. The receiver 160 may relay the other received white list(s) to the memory unit 152 for storage at the white list storage 170. The receiver 160 may also relay the other received white lists to the transmitter 158. The transmitter 158 may transmit the other received white lists to the other communications nodes 115A-N in the network 110.

Figure 2:
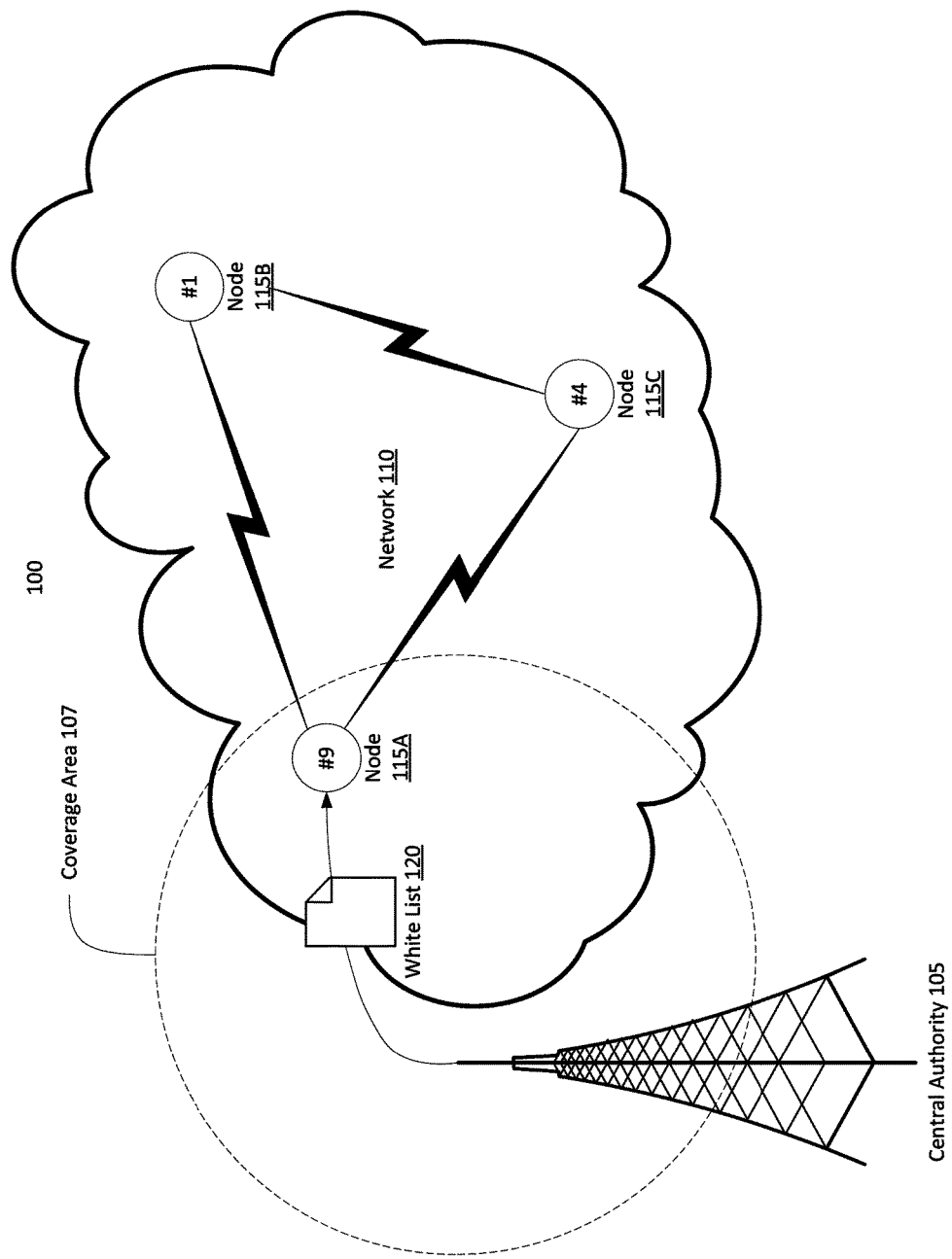
FIG. 2 is a block diagram depicting a distributed key management system with a central authority transmitting a white list to a communications node of a network, according to an illustrative embodiment.

Referring now to FIG. 2, depicted is a block diagram depicting one embodiment of a distributed key management system 100 with the central authority 105 transmitting the white list 120 to a communications node 115A-N of the network 110, in accordance with inventive concepts disclosed herein. In the depicted example, the first communications node 115A, the second communications node 115B, and the third communications node 115C may be in communication with one another. The central authority 105 may determine that first communications node 115A is within a coverage range 107 of the central authority 105, while the second communications node 115B and the third communications node 115C are outside the coverage range 107. Responsive to determining that the first communications node 115A is within the coverage range 107 and/or that the first communications node 115A is authorized to receive or access the white list 120, the transmitter 138 of the central authority 105 may transmit the white list 120 to the first communications node 115A. The receiver 160 of the first communications node 115A may then receive the white list 120 from the central authority 105.

Referring back to FIG. 1B, the white list verifier 162 for instance may detect or otherwise determine that another communications node 115A-N is joining or entering the network 110. The white list verifier 162 may, in conjunction with the network interface 156 and with the comparator 164, apply any number of communication techniques or protocols to detect the other communications node 115A-N is joining the network 110. In some embodiments, the white list verifier 162 may detect or determine that the other communications node 115A-N is joining the network 110 based on an identifier corresponding to the other communications node 115A-N, for instance included in data packets of communications in the network 110. For example, the receiver 160 may receive a data packet with a source identifier corresponding to the other communications node 115A-N. The comparator 164 may compare the source identifier with previous source identifiers associated with other communications nodes 115A-N already in the network 110. If the comparator 164 determines that the source identifier is not one of the previous source identifiers, the white list verifier 162 may determine that the communications node 115A-N has or is joining the network 110. In some embodiments, the white list verifier 162 may detect or determine that the other communications node 115A-N is joining the network 110 by identifying a change in a number of communications nodes 115A-N in the network 110 from a previous number of communications nodes 115A-N in the network 110. In some embodiments, the transmitter 158 may, responsive to determining that the other communications node 115A-N joining or entering the network 110 is on the list of communications nodes authorized to receive cryptographic keys, the white list 120 to the other communications node 115A-N that is joining or entering the network 110.

In some embodiments, the white list verifier 162 may identify the white list 120 of the other communications node 115A-N joining or entering the network 110. In some embodiments, the white list verifier 162 may identify a version of the white list 120 of the other communications node 115A-N. In some embodiments, the white list verifier 162 may replace or maintain the white list 120 of the instant communications node 115A-N, on which the white list verifier 162 is executing, responsive to receiving the identified white list 120 of the other communications node 115A-N joining or entering the network 110. In some embodiments, the white list verifier 162 may compare the version of the white list 120 of the instant communications node to the version of the white list 120 of the other communications node 115A-N. The white list verifier 162 may, responsive to determining that the version of the white list 120 of the instant communications node 115A-N precedes (e.g., is older than) the version of the white list 120 of the other communications node 115A-N, replace or supplant the white list 120 of the instant communications node 115A-N. The white list verifier 162 may, responsive to determining that the version of the white list 120 of the instant communications node 115A-N supersedes (e.g., is newer than) the version of the white list 120 of the other communications node 115A-N, maintain the white list 120 of the instant communications node 115A-N. The transmitter 158 may, responsive to determining that the version of the white list 120 of the instant communications node 115A-N supersedes the version of the white list 120 of the other communications node 115A-N, transmit the white list 120 of the instant communications node 115A-N to the other communications node 115A-N.

The white list verifier 162 may detect or otherwise determine whether the other communications node 115A-N joining the network 110 is included in the list of communications nodes authorized to receive the cryptographic key on the white list 120. The white list verifier 162 may search the list of communications node to determine whether the other communications node 115A-N joining the network 110 is included in the list of communications node of the white list 120. In some embodiments, the white list verifier 162 may determine or check the identifier of the other communications node 115A-N. In some embodiments, the white list verifier 162 may iterate through the list of communications nodes of the white list 120, e.g., for a match with the identifier. At each iteration, the comparator 164 may compare the identifier of the other communications node 115A-N with an entry of the list of the communications nodes of the white list 120. Responsive to determining that the identifier of the other communications node 115A-N matches one of the entries of the list of communications nodes, the white list verifier 162 may determine that the other communications node 115A-N joining the network 110 is included in the list of communications nodes authorized to receive the cryptographic key. Responsive to determining that the identifier of the other communications node 115A-N does not match any of the entries of the list of communications nodes, the white list verifier 162 may determine that the other communications node 115A-N joining the network is not on the list of communications nodes and is not authorized to receive the cryptographic key generated by the master communications node.

The white list verifier 162 may detect or otherwise determine that another communications node 115A-N is leaving or exiting the network 110 or otherwise no longer available or operating in the network 110. For example, the white list verifier 162 may detect that the master communications node is leaving or exiting the network 110 or is no longer available or operating in the network 110. The white list verifier 162 may, in conjunction with the network interface 156 and with the comparator 164, apply any number of communication techniques or protocols to detect the other communications node 115A-N leaving the network 110. In some embodiments, the white list verifier 162 may detect or determine that the other communications node 115A-N is re-joining the network 110 based on a time of last receipt of a data packet from the other communications node 115A-N. For example, the white list verifier 162 may store a list of communications including the identifiers of the communications node 115A-N and time stamps of the data packets received from the network 110. Iterating through the list of communications, the white list verifier 162 may for example identify one or more identifiers associated with communications nodes 115A-N not associated with data packets received within a predefined time window. In this example, the white list verifier 162 may then determine that the corresponding communications nodes 115A-N are leaving or have left the network 110. In some embodiments, the white list verifier 162 may detect or determine that the other communications node 115A-N is leaving the network 110 by identifying a change in a number of communications nodes 115A-N in the network 110 from a previous number of communications nodes 115A-N in the network 110.

The white list verifier 162 may determine, responsive to detecting that the other communications nodes 115A-N from the list of communications nodes is joining the network 110, whether the instant communications node 115A-N or the other communications node 115A-N is to be the master communications node in the network 110 in accordance with the one or more criteria included in the white list 120. The white list verifier 162 may also determine, responsive to detecting that the other communications node(s) 115A-N (from the list of communications nodes) is entering the network 110 or that the master communications node is no longer available in the network 110, whether the instant communications node 115A-N or any of the other communications node 115A-N in the network 110 is to be the master communications node in the network 110 in accordance with the one or more criteria included in the white list 120. In some embodiments, the white list verifier 162 may apply or execute the one or more criteria of the white list 120 for selecting or determining the master communications node in the network 110. The one or more criteria for selecting the master communications node from the one or more communications nodes 115A-N may include, use or specify any number of methods, such as comparing or evaluating identifiers of communications nodes.

The white list verifier 162 may select or determine the master communications node for each of the one or more security levels designated in the white list 120. In some embodiments, the white list verifier 162 may identify the security level for each of the one or more communications nodes 115A-N as specified in the white list 120. In some embodiments, the white list verifier 162 may identify subsets of the communications nodes 115A-N by the designated security level as specified in the white list 120. Each subset of communications nodes 115A-N corresponding to a different security level may use a separate cryptographic key distributed among the communications nodes 115A-N within the respective subset. In some embodiments, the white list verifier 162 may identify the security level for the instant communications node 115A-N. In some embodiments, the white list verifier 162, using the comparator 164, may compare the security level for the instant communications node 115A-N to the security level of a communications node 115A-N entering or joining the network 110. In some embodiments, the white list verifier 162 may, responsive to determining that the security level of the instant communications node 115A-N is the same as the security level of the communications node 115A-N entering or joining the network 110, apply the one or more criteria of the white list 120 for selecting or determining the master communications node from the subset of the communications node 115A-N with the same security level as the instant communications node 115-N. In some embodiments, the white list verifier 162 may, responsive to determining that the security level of the instant communications node 115A-N is greater than the security level of the communications node 115A-N entering or joining the network 110, apply the one or more criteria of the white list 120 to select or determine the master communications node from the subset of the communications node 115A-N with the same security level as the entering or joining communications node 115A-N.

In some embodiments, the white list verifier 162, responsive to applying the one or more criteria of the white list 120, may select or determine the master communications node based at least in part on the identifier 172 for each of the one or more communications node 115A-N. In some embodiments, the white list verifier 162, in conjunction with the network interface 156, may transmit a request for identifiers to the one or more other communications nodes 115A-N in the network 110, including to a communications node 115A-N joining the network 110. The white list verifier 162 may subsequently receive the identifier 172 from each of the one or more communications nodes 115A-N in the network 110. The white list verifier 162, using the comparator 164, may compare the identifier 172 of the instant communications node 115A-N to the identifiers 172 for each of the other communications nodes 115A-N to determine whether the instant communications node 115A-N or one of the other communications nodes 115A-N is to be the master communications node in the network 115. For example, the one or more criteria may specify that a communications node 115A-N within the network 110 corresponding to the highest or lowest numerical identifier is to be the master communications node. It is possible that, after having received the identifiers for the communications nodes 115A-N in the network 110, the white list verifier 162 may determine the communications node 115A-N with the highest numerical identifier 172 is the instant communications node 115A-N. Responsive to this determination, the white list verifier 162 may designate the instant communications node 115A-N as the master communications node in the network 110.

In some embodiments, the white list verifier 162, applying the one or more criteria of the white list 120, may select or determine the master communications node based on a sequence, priority or order of the communications nodes 115A-N in the network 110. For example, the one or more criteria may specify that the first or latest communications node 115A-N to enter the network 110 is to be the master communications node. In some embodiments, the white list verifier 162 may track or maintain a list of communications nodes in the network 110 by a sequence in which the communications nodes 115A-N entered or joined the network 110. In some embodiments, the white list verifier 162 may update, responsive to detecting or determining that one of the communications nodes 115A-N joined or exited the network 110, the list of communications nodes in the network 110 by sequence. In some embodiments, the white list verifier 162 may subsequently identify the first or last communications node 115A-N to enter or join the network 110. In some embodiments, the white list verifier 162 may designate or set the identified first or last communications node 115A-N as the master communications node for the network 110.

The white list verifier 162 may determine or select the instant communications node 115A-N, on which the white list verifier 162 is executing, is to be the master communications node for the network 110. The key generator 166 may, responsive to the white list verifier 162 determining that the instant communications node 115A-N is to be the master communications node for the network, generate a cryptographic key for distribution. The key generator 166, in conjunction with the random number generator 168, may generate the cryptographic key for distribution using any number of asymmetric or symmetric encryption schema. Examples of the cryptographic algorithm may include MD5 message-digest algorithm, RSA encryption algorithm, elliptic curve cryptography (ECC), cryptographic hash function (e.g., FSB, GCM, SHA-1, SHA-2, HMAC, etc.), block cipher (e.g., Twofish, AES, DES, etc.), or any number of symmetric or asymmetric encryption schema. In some embodiments, the key generator 166 may identify the cryptographic algorithm specified in the white list 120 and/or a seed from the white list 120. In some embodiments, the key generator 166 may generate the cryptographic key for distribution in accordance to the cryptographic algorithm specified in the white list 120 and/or the seed included in the white list 120. For example, the cryptographic algorithm specified in the white list 120 may be an asymmetric encryption algorithm, such as the MD5 algorithm. The key generator 166 may retrieve the white list 120 stored at the white list storage 170, and may identify the MD5 algorithm as the specified cryptographic algorithm and the seed. The key generator 166 may execute the hash function of the MD5 algorithm and seed to the random number generator 168 to calculate two cryptographic keys, one private and one public.

In some embodiments, the key generator 166 may perform cryptographic key generation any number of times, e.g., to generate a plurality of cryptographic keys. A subsequently generated cryptographic key may replace, supersede, or otherwise supplant a previously generated cryptographic key. The key generator 166 may generate a time stamp with a generated cryptographic key and may associate the time stamp with the cryptographic key. The key generator 166, in conjunction with the comparator 164, may compare the time stamps for each of the generated cryptographic keys to identify the most recently generated (e.g., valid or up-to-date) cryptographic key. The key generator 166 may in some embodiments set, apply or associate the version of the white list 120 used to generate the cryptographic key, to the cryptographic key. The key generator 166, in conjunction with the comparator 164, may compare the versions for each of the generated cryptographic keys to identify a cryptographic key associated with the most recent version of the white list 120. The key generator 166 may store or maintain a copy of the identified cryptographic key, e.g., in storage 170. The key generator 166 may use the identified cryptographic key to encode subsequent data packets transmitted to the network 110 via the network interface 156. The key generator 166 may use the identified cryptographic key to decode subsequent data packets received from the network 110 via the network interface 156.

The key generator 166 may transmit, via the transmitter 158 of the network interface 156, the generated or identified cryptographic keys to each of the one or more communications nodes 115A-N from the list of communications nodes included in the white list 120. The key generator 166 may transmit, via the transmitter 158, the generated cryptographic keys to each of the one or more communications nodes 115A-N from the list of communications nodes in accordance with a key transfer protocol. The key transfer protocol may be specified by the white list 120 or may be preset. Examples of the key transfer protocol may include Diffie-Hellman key exchange, quantum key exchange (e.g., BB84), password-verification key agreement, web of trust, TSL-PSK, Firefly key exchange protocol, public key infrastructure (e.g., X.509 digital certificate), or any number of asymmetric key or symmetric public key sharing protocols. In some embodiments, under an asymmetric encryption scheme, the key generator 166 may transmit the generated public cryptographic key in accordance with the key transfer protocol. In some embodiments, under a symmetric encryption scheme, the key generator 166 may transmit a generated cryptographic key in accordance with the key transfer protocol.

Figure 3:
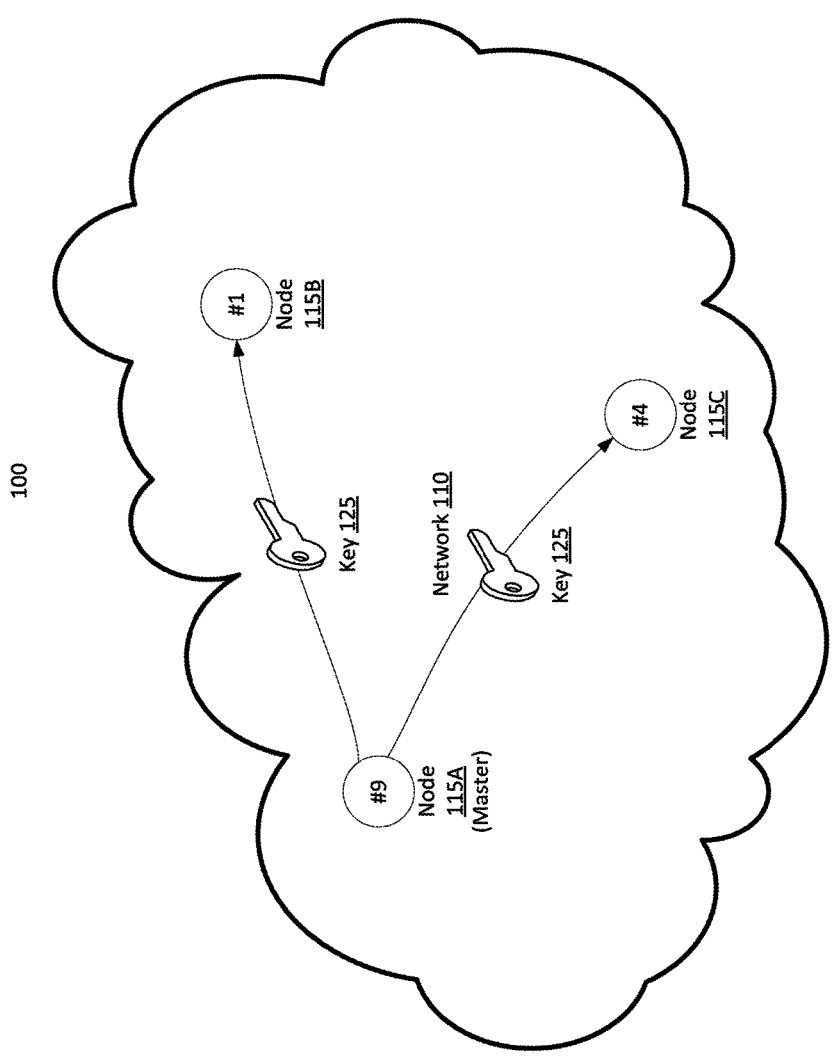
FIG. 3 is a block diagram depicting a distributed key management system with a master communications node distributing an cryptographic key to other communications nodes of a network, according to an illustrative embodiment.

Referring now to FIG. 3, depicted is a block diagram depicting one embodiment of a distributed key management system 110 with a master communications node 115A distributing an cryptographic key 125 to other communications nodes 115B and 115C of the network, in accordance with inventive concepts disclosed herein. In the example depicted in FIG. 3, the white list 120 may have specified that the communications node 115A-C with the highest numerical device identifier 172 is to be the master communications node. In this case, the numerical device identifier 172 of the first communications node 115A is "#9", that of the second communications node 115B is "#1", and that of the third communications node 115C is "#4". The white list verifier 162 of each of the three communications nodes 115A-C may have identified that three of the communications nodes 115A-N are part of the list of communications nodes authorized to receive cryptographic keys from the white list 120.

Furthermore, the white list verifier 162 of each of the three communications nodes 115A-N may have identified the numerical device identifiers of each communications node, and may have determined that the highest numerical device identifier corresponds to the first communications node 115A. As a result (or via different specified selection criteria), the first communications node 115A may have been designated as the master communications node for the network 110. The key generator 166 of the first communications node 115A may then generate a cryptographic key 125 using the encryption algorithm specified in the white list 120 The key generator 166 of the first communications node 115A may then distribute the generated cryptographic key 126 using the key transfer protocol specified in the white list 120 (e.g., designating the first communications node 115A as the root certificate authority in X.509 key transfer protocol).

Figure 4:
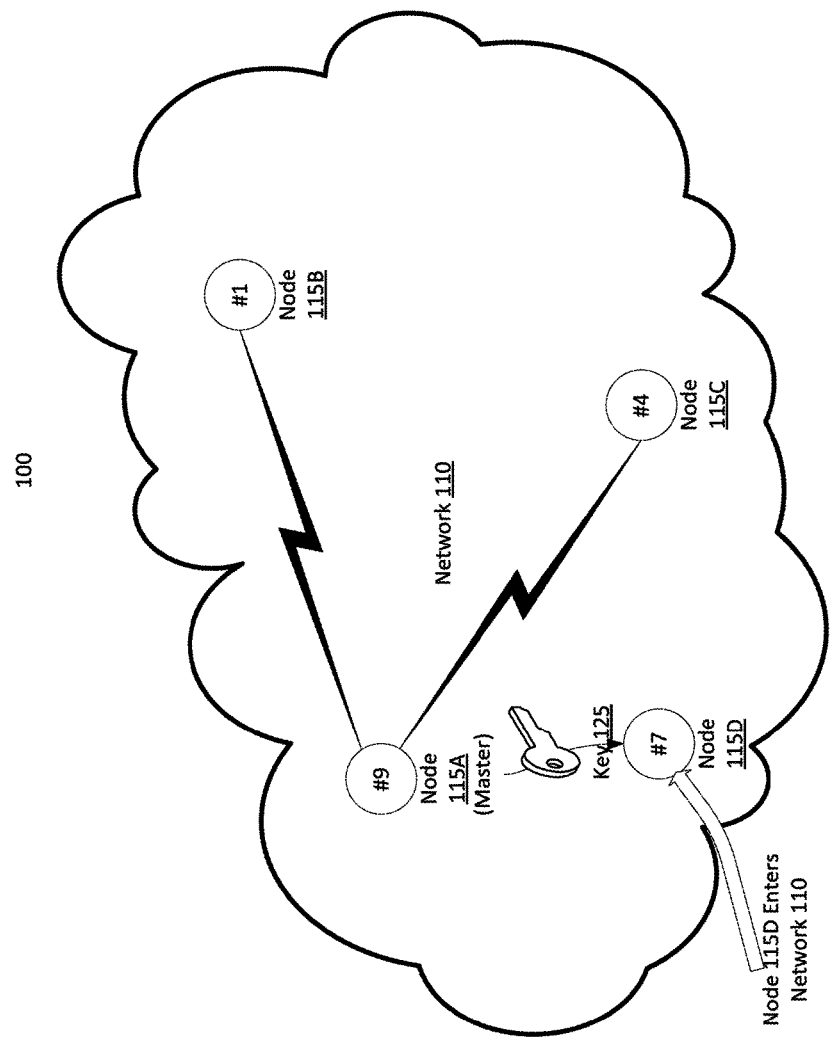
FIG. 4 is a block diagram depicting a distributed key management system with a master communications node distributing a cryptographic key to a communications node newly entering a network, according to an illustrative embodiment.

Referring now to FIG. 4, depicted is a block diagram of one embodiment of a distributed key management system 110 with a master communications node 115A distributing the cryptographic key to a communications node 115D newly entering a network 110, in accordance with inventive concepts disclosed herein. In the example depicted in FIG. 4, the first communications node 115A may have been designated as the master communications node for the network 110 based on having the highest device identifier. When the fourth communications node 115D joins the network 110, the first communications node 115A, or any of the other communications nodes 115B and 115C may determine whether the fourth communications node is on the list of communications nodes from the white list 120 authorized to receive the generated cryptographic key 125. In this case, the first communications node 115A may have determined that the fourth communications node 115D is on the list of communications node from the white list 120 authorized to receive the generated cryptographic key 125. In turn, the first communications node 115A and/or the other two communications nodes 115B and 115C may determine whether the newly joined communications node 115D is to be the new master communications node, for example by comparing the numerical device identifier 172 of the fourth communications node 115D to the respective numerical device identifier 172 of each of the other communications nodes 115A-C. As the numerical device identifier for the fourth communications node 115D is lower than that of the first communications node 115A, the first communications node 115A may continue to be the master communications node and may transmit the generated cryptographic key to the fourth communications node 115D.

Referring back to FIG. 1B, the white list verifier 162, responsive to applying the one or more criteria of the white list 120, may determine that one of the other communications nodes 115A-N besides the instant communications node 115A-N is to be the master communications node for the network 110. In some embodiments, the white list verifier 162 may transmit a request for a cryptographic key to the master communications node. The receiver 160 may subsequently receive the cryptographic key generated by the communications node 115A-N designated as the master communications node for the network 110. The receiver 160 may relay the received cryptographic key for storage on the memory unit 152. In some embodiments, the receiver 160, in conjunction with the key generator 166, may receive the cryptographic key generated by the master communications node in accordance to the key transfer protocol. In some embodiments, the transmitter 158, in conjunction with the key generator 166 may transmit the cryptographic key to other communications nodes 115A-N in the network 110. The key transfer protocol may be specified by the white list 120 or pre-set by default. Examples of the key transfer protocol may include Diffie-Hellman key exchange, quantum key exchange (e.g., BB84), password-verification key agreement, web of trust, TSL-PSK, Firefly key exchange protocol, public key infrastructure (e.g., X.509 digital certificate), or any number of asymmetric key or symmetric public key sharing protocols. The key generator 166 may use the received cryptographic key generated by the master communications node to encode and decode data packets transmitted and received among the communications nodes 115A-N of the network 110.

In certain embodiments, the white list verifier 162 may transmit a request for a cryptographic key to another communications node 115A-N besides the master communications node. The white list verifier 162 may subsequently receive the cryptographic key generated by the master communications node via the communications node 115A-N that received the request for the cryptographic key. In some embodiments, the network interface 156, in conjunction with the processing unit 150, may determine that that a communications node 115A-N designated as the master communications node for the network 110 is outside a range of direct communications. In some embodiments, the network interface 156 may identify one or more communications nodes 115A-N within the range of direct communications. The network interface 156 may determine that the identified one or more communications nodes 115A-N does not include the master communications node. The transmitter 158 of the network interface 156 may subsequently transmit the request for the cryptographic key to one of the identified one or more communications nodes 115A-N.

The key generator 166, in conjunction with the comparator 164, may compare a received cryptographic key to a previously used cryptographic key to determine whether the received cryptographic key replaces, supersedes, or otherwise supplant the previously used cryptographic key. In some embodiments, the key generator 166 may identify a time stamp associated with the received cryptographic key and a time stamp associated with the previously used cryptographic key. Each time stamp may indicate or specify the time at which the respective cryptographic key was generated. In some embodiments, a version or other indicator may be used in place of a time stamp, for each cryptographic key. The key generator 166 may use the cryptographic key identified as the most recently generated to encode and decode subsequent data packets communicated to and from the network 110 via the network interface 156. In some embodiments, the key generator 166 may identify a version associated with the received cryptographic key and a version associated with the previously used cryptographic key. The version may indicate the version of the white list 120 associated with the generation of the respective cryptographic keys. For example, white list 120 version "1.0" may have been used in identifying a master communications node to generate the previously used cryptographic key, while white list 120 version "1.3" may have been used in association with the generation of the received cryptographic key. The key generator 166 may replace the previously used cryptographic key and use the received cryptographic key to decode and encode data packets communicated among the communications nodes 115A-N of the network 110, responsive to determining that the received key is newer or more up-to-date than that of the previously used cryptographic key, or determining that the version associated with the received key supersedes the version associated with the previously used cryptographic key. The key generator 166 may continue to use the previously used cryptographic key to decode and encode data packets received and transmitted among the communications nodes 115A-N of the network 110, responsive to determining that the received key is older or less up-to-date than the time stamp of the previously used cryptographic key, or that the version associated with the received key is less or older than the version associated with the previously used cryptographic key.

Figure 5:
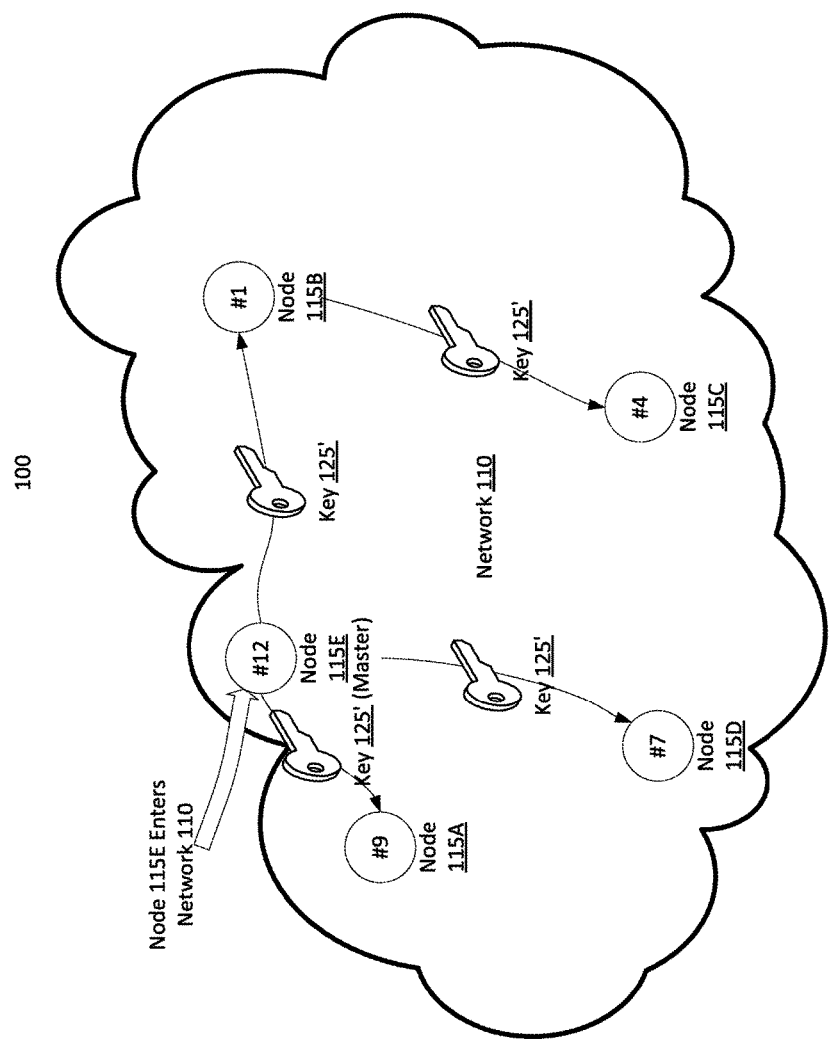
FIG. 5 is a block diagram depicting a distributed key management system with a communications node newly entering a network becoming the master communications node and distributing a new cryptographic key to other communications nodes of the network.

Referring now to FIG. 5, depicted is a block diagram of one embodiment of a distributed key management system 100 with a communications node 115E newly entering a network and becoming a master communications node and distributing a new cryptographic key 125' to the other communications nodes 115A-D of the network 110. In the example depicted in FIG. 5, the fifth communications node 115E may have entered or joined the network 110. Each of the five communications nodes 115A-E may have identified, ranked or compared the numerical device identifier 172 for each of the communications nodes 115A-E. As the fifth communications node 115E has the highest numerical device identifier ("#12"), or has met a different specified selection criteria, the fifth communications node 115E may have been designated as the master communications node for the network 110. As a result, the first communications node 115A may halt distribution of the cryptographic key 125 generated by the key generator 166 of the first communications node 115A. In addition, the key generator 166 of the fifth communications node 115E may start generating the cryptographic key in accordance to the cryptographic algorithm and/or any seed specified in the white list 120. The network interface 156, in conjunction with the key generator 166, of the fifth communications node 115E may start distributing the generated cryptographic key to the four other communications nodes 115A-D. The third communications nodes 115C may be out of range of the fifth communications node 115E for direct transmission of the cryptographic key. The third communications node 115C may receive the cryptographic key generated by the fifth communications node 115E via the second communications node 115B.

Referring back to FIG. 1B, in some embodiments, the white list verifier 162 may detect or otherwise determine that a plurality of communications nodes 115A-N is joining the network 110. The plurality of communications nodes 115A-N may belong to another network separate from the network 110. In some embodiments, the communications nodes 115A-N of the instant network 110 may initiate a handshaking process with the plurality of communications nodes 115A-N of the other network to form a merged network. In some embodiments, the white list verifier 162 may, in conjunction with the network interface 156 and with the comparator 164, apply any number of communication techniques or protocols to detect the plurality of other communications node 115A-N joining the network 110 or another network of communications nodes joining the network 110. The functionalities of the white list verifier 162, the comparator 164, the key generator 166, and the random number generator 168 may be performed or repeated over multiple subsets of communications nodes 115A-N, such as those in different networks merging into one network 110.

In some embodiments, the white list verifier 162 may determine, responsive to detecting or otherwise determining that the plurality of communications node 115A-N is joining the network 110, whether any one communications node 115A-N of the plurality of other communications nodes 115A-N is to be the master communications node for the network 110. In some embodiments, the white list verifier 162 may detect or otherwise determine whether the plurality of other communications nodes 115A-N joining the network 110 is included in the list of communications nodes authorized to receive the cryptographic key according to the white list 120. In some embodiments, the white list verifier 162 may identify or retrieve the identifier 172 for each of the plurality of other communications nodes 115A-N of the other network. The white list verifier 162 may search the list of communications nodes using the retrieved identifiers, to determine whether each of the other plurality of communications nodes 115A-N of the other network joining the network 110 is included in the list of communications node of the white list 120. The white list verifier 162 may, responsive to determining one or more matches between the retrieved identifiers and the list of communications nodes, determine that the respective communications nodes 115A-N of the plurality of other communications nodes 115A-N of the other network is on the list of authorized communications nodes. The white list verifier 162 may also determine whether the instant communications node 115A-N or any of the plurality of others communications node 115A-N in the other network is to be the master communications node in the merged network in accordance with the one or more criteria included in the white list 120.

In some embodiments, the white list verifier 162 may compare the white list 120 of the instant network 110 to the white list of the other network to resolve which white list is to be used in the merged network. In some embodiments, the white list verifier 162 may compare a version of the white list 120 of the instant network to a version of the white list of the other network. In some embodiments, the white list verifier 162 may, responsive to determining that the version of the instant network supersedes the version of the other network, continue to use the white list 120 of the instant network over the merged network. In some embodiments, the white list verifier 162 may, responsive to determining that the version of the instant network precedes (or is superseded by) the version of the other network, replace the white list 120 of the instant network with the white list of the other network. Once a white list 120 determined or selected for the merged network, the white list verifier 162 may select or confirm a master communications node for the merged network in accordance with the selected white list. In addition, the a generator 166 of the master communications node may generate the cryptographic key in accordance with the cryptographic algorithm specified in the selected white list and distribute the cryptographic key in accordance with the key transfer protocol specified in the white list for the merged network.

Figure 6:
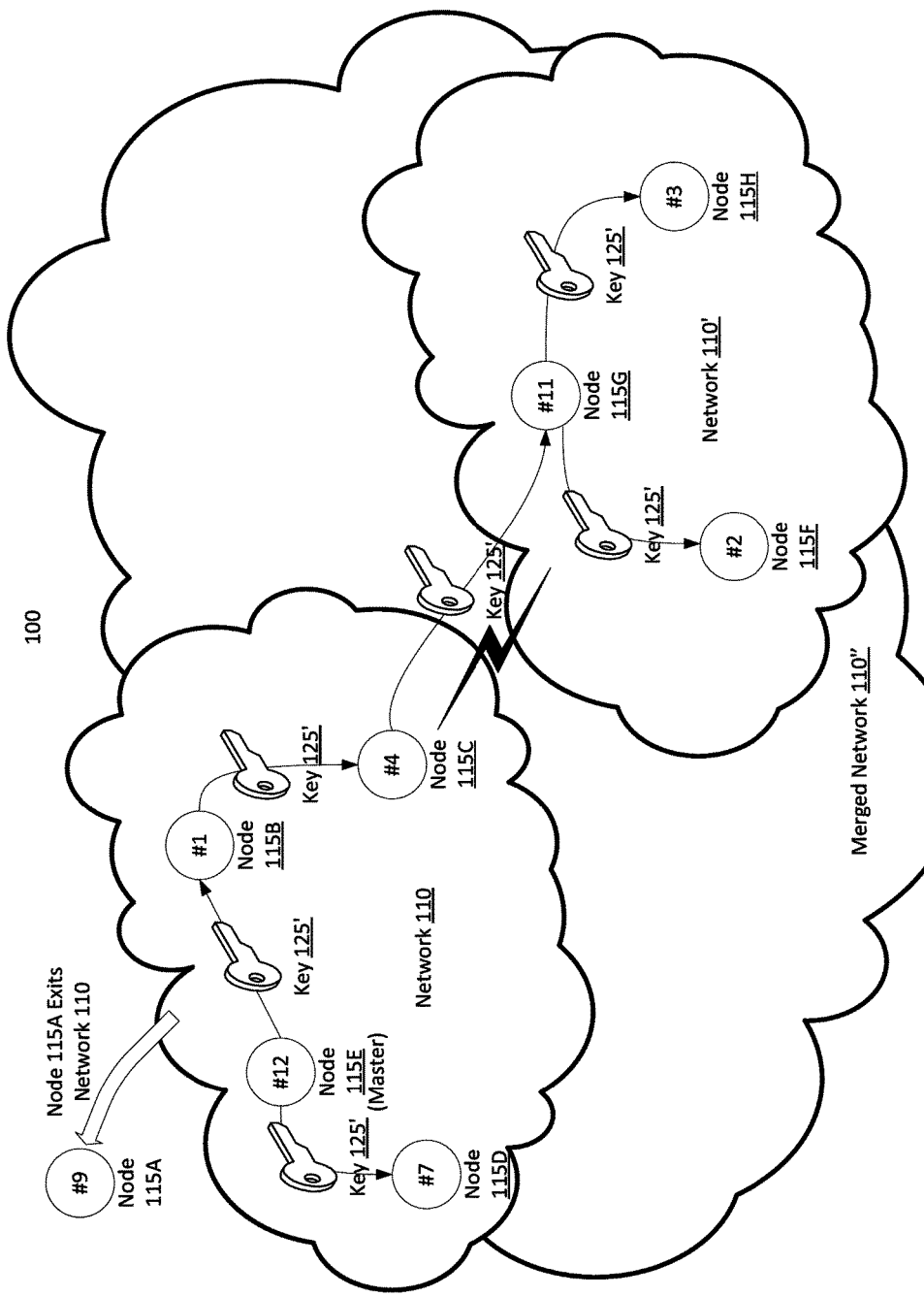
FIG. 6 is a block diagram depicting a distributed key management system with a new master communications node distributing a new cryptographic key to communications nodes of another network merged with an original network.

Referring now to FIG. 6, depicted is a block diagram of one embodiment of a distributed key management system 100 with a new master communications node 115E distributing a new cryptographic key 125' to communications nodes 115F-H of another network 110' merged with an original network 110 to form a merged network 110". In the example depicted in FIG. 6, the network 110 and the other network 110' may originally have had different master communications nodes (e.g., the fifth communications node 115E in the network 110 and the seventh communications node 115G in the network 110') to generate and distribute cryptographic keys. At least one of the communications nodes 115A-E of the network 110 and at least one of the communications nodes 115F-H of the network 110' may have initiated handshaking processes with one another to form the merged network 110". Once the networks 110 and 110' are linked or merged, a white list verifier 162 of at least one of the communications nodes 115A-H may determine whether each of the other communications nodes 115A-H is on the list of communications nodes authorized to receive cryptographic keys. If the white lists 120 used in each network 110 and 110' are of different versions, one or more communications nodes 115A-H may resolve this situation by identifying and using the white list 120 with the most recent version.

Continuing with FIG. 6, once the communications nodes 115A-H are verified as being on the list of communications nodes authorized to receive the cryptographic key, the white list verifier 162 of each of the communications nodes 115A-H may then select one of the communications nodes 115A-H as the master communications node. The white list verifier 162 of each of the communications nodes 115A-H may identify the numerical device identifier of each of the communications nodes 115A-H for example, and may find the communications node 115A-H corresponding to the highest numerical device identifier (or meeting a specified selection criteria). By way of illustration, as the fifth communications node 115E corresponds to the highest numerical device identifier ("#12") per the specified criteria, the communications nodes A-H may identify the fifth communications node 115E as the master communications node. The fifth communications node 115E, as the master communications node, may distribute the cryptographic keys 125' to the communications nodes 115F-H of the newly joined network 110'. As the communications nodes 115F-H may not be in direct communication with the fifth communications node 115E, the communications nodes 115F-H may receive the cryptographic key 125' via the third communications node 115C for instance. Sometime during this process, the first communications node 115A may have exited the network 110. As the first communications node was not the master communications node 110, the designation of the master communications node to the fifth communications node 115E may remain unaffected.

Figure 7:
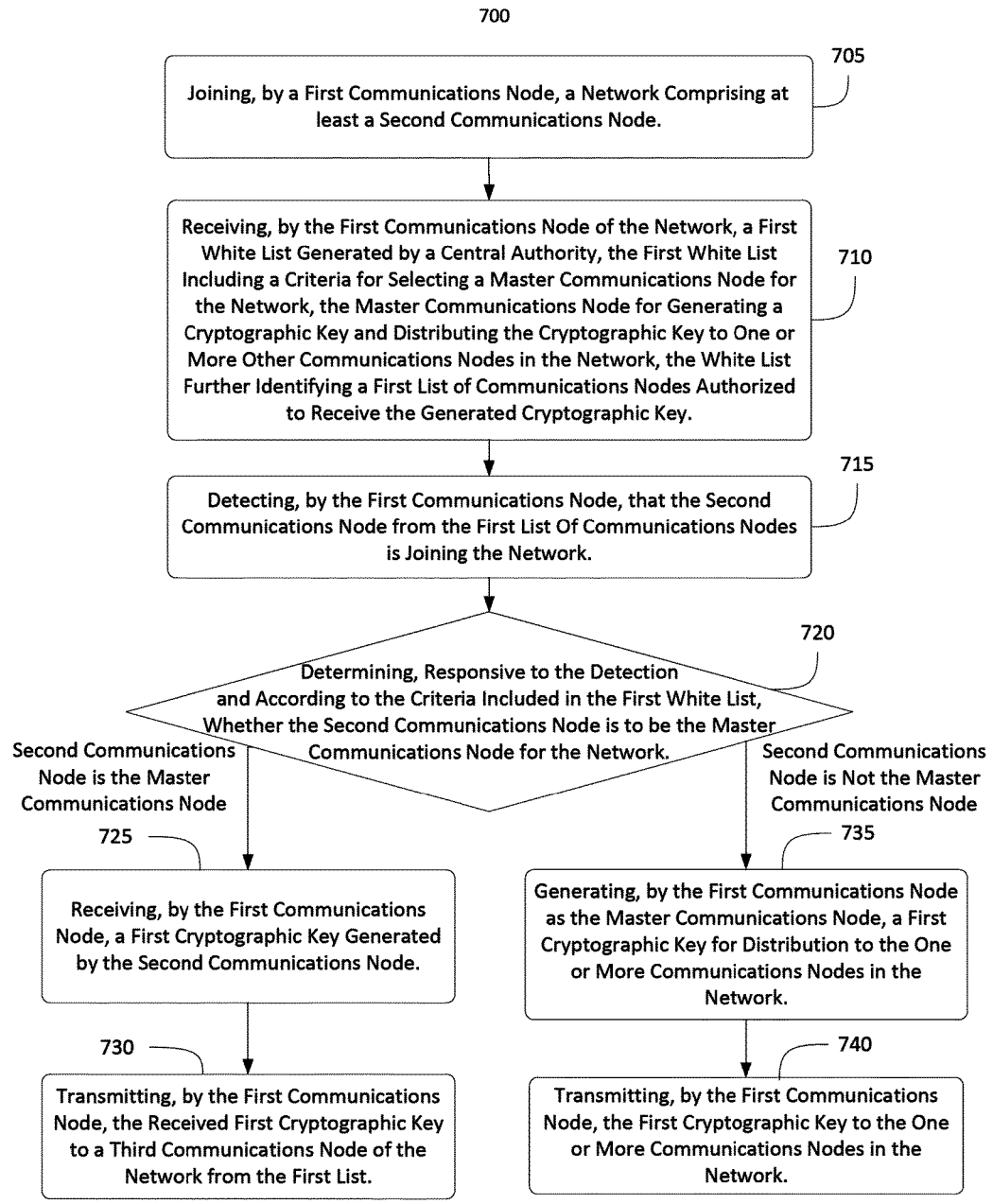
FIG. 7 is a flow diagram depicting a method for distributed key management, according to an illustrative embodiment.

Referring now to FIG. 7, depicted is a flow diagram of one embodiment of a method 700 for distributed key management, in accordance with inventive concepts disclosed herein. The functionalities of method 700 may be implemented by any plurality of computing devices with communications and encryption/decryption functionalities, such as the central authority 105 and the one or more communications nodes 115A-N of the distributed key management system 100 depicted in FIGS. 1A and 1B. In brief overview, a first communications node may join a network comprising at least a second communications node (705). The first communications node of the network may receive a first white list generated by a central authority (710). The first communications node may detect that the second communications node from the first list of communications nodes is joining the network (715). The first communications node may determine, responsive to the detection and according to the one or more criteria included in the first white list, whether the second communications node is to be the master communications node for the network (720). If the second communications node is to be the master communications node, the first communications node may receive a first cryptographic key generated by the second communications node (725). The first communications node may also transmit the received first cryptographic key to a third communications node of the network from the first list (730). If the second communications node is not to be the master communications node for the network, the first communications node as the master communications node may generate a first cryptographic key for distribution to the one or more communications nodes in the network (735). The first communications node may also transmit the first cryptographic key to the one or more communications nodes in the network (740).

In further detail, referring to (705) and in some embodiments, the first communications node may join a network comprising at least a second communications node. For example, the first communications node may join another pre-existing network by initiating a handshaking process with at least one of the communications node in the pre-existing network. The first communications node may also establish or create a network by initiating a handshaking process with a second communication node. Additional communications nodes may also join the network by initiating communications with the first communications node or the second communications node. The first communications node may also start or join a network with the central authority.

Referring to (710) and in some embodiments, the first communications node of the network may receive a first white list generated by a central authority. For example, the central authority may generate the first white list. The first white list may include one or more criteria for selecting a master communications node for the network, identify a list of communications nodes authorized to receive the cryptographic key generated by the master communications node, a seed for generating the cryptographic key (which is not required in some embodiments), and/or the security levels for each of the communications nodes on the list of the communications nodes, among possibly other specifications. The first communications node may transmit, via the network interface, a request for the first white list to the central authority or to another communications node in the network. The first communications node may subsequently receive the first white list from the central authority. The first communications node may receive the first white list from another communications node in the network.

Referring to (715) and in some embodiments, the first communications node may detect that the second communications node from the first list of communications nodes is joining the network. For example, the first communications node may detect the presence of the second communications node by detecting signals from the second communications node. In some embodiments, the first communications node may detect the presence of the second communications node by for example reading data packets for a device identifier received and transmitted among the communications nodes of the network. The first communications node may compare the identified device identifier with identifiers included in the first list of communications nodes. Upon finding a match between the identified device identifier and one of the identifiers on the first list of communications nodes, the first communications node may determine that the second communications node (identified from the first list of communications nodes) is joining the network.

Referring to (720) and in some embodiments, the first communications node may determine, responsive to the detection and according to the one or more criteria included in the first white list, whether the second communications node is to be the master communications node for the network. For example, the first communications node may select or determine whether the first communications node or the second communications node is to be the master communication node using the selection criteria specified in the white list received from the central authority. The selection criteria may for instance specify that the master communication node is to be selected based in part on the device identifier of each of the communication nodes in the network.

Referring to (725) and in some embodiments, if the second communications node is to be the master communications node, the first communications node may receive a first cryptographic key generated by the second communications node. For example, the first communications node may have determined that the second communications node is to be the master communications node for the network based on the second communications node having the lowest numerical device identifier in the network (or meeting the specified selection criteria). The first communications node may then transmit a request for a cryptographic key to the second communication node. The first communications node may subsequently receive the cryptographic key generated by the second communication node.

Referring to (730) and in some embodiments, the first communications node may also transmit the received first cryptographic key to a third communications node of the network from the first list. For example, the third communications node may be outside the range of direct wireless communications with the second communications node. The first communications node may receive a request for the cryptographic key, responsive to the third communications node determining that the second communications node is outside the range of direct communications. The first communications node may then transmit the cryptographic key generated by and received from the second communications node.

Referring to (735) and in some embodiments, if the second communications node is not to be the master communications node for the network, the first communications node as the master communications node may generate a first cryptographic key for distribution to the one or more communications nodes in the network. For example, the first communications node and the second communications node may have determined that the first communications node is to be the master communications node based on the selection criteria, e.g., the first communications node having the lowest numerical device identifier. The first communications node may then generate one or more cryptographic keys (e.g., private and public keys in asymmetric encryption schema) using the cryptographic algorithm and the seed specified in the white list.

Referring to (740) and in some embodiments, the first communications node may also transmit the first cryptographic key to the one or more communications nodes in the network. For example, subsequent to generating the first cryptographic key (e.g., public key in asymmetric encryption schema or a single key in symmetric encryption schema), the first communications node may transmit or distribute the first cryptographic key to each of the other communications nodes in the network. Some of the other communications nodes may receive the first cryptographic key via another communication node.

The construction and arrangement of the systems and methods are described herein as illustrative examples and are not to be construed or interpreted as limiting. Although only a few embodiments have been described in detail in this disclosure, many modifications are possible (e.g., encryption algorithms, key distribution schemes, expiration time, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A method for distributed key management, the method comprising:
   receiving, by a first communications node of a network, a first white list generated by a central authority, the first white list including one or more criteria for selecting a master communications node for the network, the master communications node different from the central authority, the master communications node for generating a cryptographic key and distributing the cryptographic key to one or more other communications nodes in the network, the white list further identifying a first list of communications nodes authorized to receive the generated cryptographic key;
   detecting, by the first communications node, that a second communications node from the first list of communications nodes is joining the network;
   determining, responsive to the detection of the second communications node joining the network by the first communications node, that the second communications node is to be the master communications node for the network based on the one or more criteria of the first white list generated by the central authority;
   receiving, by the first communications node, the cryptographic key generated by the second communications node determined to be the master communications node; and
   transmitting, by the first communications node, the received cryptographic key to a third communications node of the network from the first list.

2. The method of claim 1, further comprising receiving, by the first communications node, a second white list from the second communications node to replace the first white list, wherein the second white list has a version that supersedes that of the first white list.

3. The method of claim 1, further comprising sending, by the first communications node, the first white list to the second communications node.

4. The method of claim 1, comprising:
   detecting, by the first communications node, that a plurality of communications nodes is joining the network, the plurality of communications nodes including the second communications node; and
   determining, responsive to the detection and according to the one or more criteria included in the first white list, whether any one of the plurality of communications nodes is to be the master communications node for the network.

5. The method of claim 1, wherein the one or more criteria for determining the master communications node comprises one or more criteria based at least in part on an identifier of a candidate communications node.

6. The method of claim 1, further comprising detecting, by the first communications node, that the master communications node in the network is no longer available, and identifying, according to the one or more criteria included in the first white list, a new master communications node for the network.

7. The method of claim 1, wherein the first white list includes the first list of communications nodes authorized for a first security level using the generated cryptographic key, the method further comprising receiving, by the first communications node, a second white list including a second list of communications nodes authorized for a second security level using a second cryptographic key.

8. A communications node for use in distributed key management, the communications node comprising:
- a receiver configured to receive a first white list generated by a central authority, the first white list including one or more criteria for selecting a master communications node for a network, the master communications node different from the central authority, the master communications node for generating a cryptographic key and distributing the cryptographic key to one or more other communications nodes in the network, the white list further identifying a first list of communications nodes authorized to receive the generated cryptographic key;
- a memory configured to store the received first white list;
- a processor configured to detect that a second communications node from the first list of communications nodes is joining the network, and to determine, responsive to the detection of the second communications node joining the network, that the second communications node is to be the master communications node for the network based on the one or more criteria of the first white list generated by the central authority; and
- a transmitter configured to receive the cryptographic key generated by the second communications node determined to be the master communications node, and to transmit the received cryptographic key to a third communications node of the network from the first list.

9. The communications node of claim 8, wherein the receiver is further configured to receive a second white list from the second communications node to replace the first white list, wherein the second white list has a version that supersedes that of the first white list.

10. The communications node of claim 8, further comprising a transmitter configured to transmit the first white list to the second communications node.

11. The communications node of claim 8, wherein the processor is further configured to detect that a plurality of communications nodes including the second communications node is joining the network, and to determine, responsive to the detection and according to the one or more criteria included in the first white list, whether any one of the plurality of communications nodes is to be the master communications node for the network.

12. The communications node of claim 8, wherein the communications node is the master communications node, the communications node further comprising a key generator configured to generate cryptographic keys for distributing to one or more communications nodes in the network.

13. The communications node of claim 8, wherein the processor is further configured to detect that the master communications node in the network is no longer available, and to identify, according to the one or more criteria included in the first white list, a new master communications node for the network.

14. A method for distributed key management, the method comprising:
- joining, by a first communications node, a network comprising at least a second communications node;
- receiving, by the first communications node, a first white list from the second communications node, the first white list generated by a central authority and including one or more criteria for selecting a master communications node for the network, the master communications node different from the central authority, the master communications node for generating a cryptographic key and distributing the cryptographic key to one or more other communications nodes in the network, the white list further identifying a first list of communications nodes authorized to receive the generated cryptographic key;
- determining, by the first communications node, responsive to joining the network, that the first communications node is to be the master communications node for the network based on the one or more criteria of the first white list generated by the central authority; and
- generating, by the first communications node, the cryptographic key for distribution to one or more communications nodes in the network responsive to determining that the first communications node is to be the master communications node.

15. The method of claim 14, wherein receiving the first white list comprises receiving the first white list to replace a second white list stored in the first communications node, wherein the first white list has a version that supersedes that of the second white list.

* * * * *